JOHN CARNRICK, OF NEW YORK, N. Y., ASSIGNOR TO READ, CARN- RICK, AND ANDRUS, OF THE SAME PLACE.

Letters Patent No. 87,393, dated March 2, 1869.

IMPROVED MEDICAL COMPOUND.

The Schedule referred to in these Letters Patent and making part of the same

*To all whom it may concern:*

Be it known that I, JOHN CARNRICK, of the city, county, and State of New York, have invented a new and improved Medical Compound; and I do hereby declare that the following is a full, clear, and exact description thereof, which will enable others to make and use the same.

My improved medical compound is intended for medical use, as a cure for dyspepsia and kindred diseases.

In preparing my improved compound, I use, as a vehicle, any suitable sirup, elixir, or menstruum; but that which I prefer is an elixir composed of alcohol and sugar, made and flavored in the usual manner well known to druggists.

To every drachm of the elixir or other vehicle, I add five grains of freshly-prepared pepsin, composed, in the usual manner, of two and a half grains of starch and two and a half grains of pepsin; or I dissolve the prepared pepsin in water or other liquid, and add such a portion of the solution as contains five grains of the prepared pepsin to the said one drachm of the elixir.

I also add to the said one drachm of the elixir or other vehicle, one seventy-fifth-part of one grain of strychnia, which may be dissolved in alcohol.

I also add to the said one drachm of elixir or other vehicle, one grain of ammonia, citrate of bismuth, or other salt of bismuth, which may be dissolved in water.

The compound, when thus prepared, is ready for use, and will be found highly advantageous when medically employed, as before indicated, the dose being one teaspoonful immediately before meals.

I do not limit or confine myself to the precise proportions of ingredients mentioned.

What I claim as new, and desire to secure by Letters Patent, is—

The improved medical compound, made by combining strychnia and ammonia, citrate of bismuth, or either of them, with pepsin, substantially as described.

JOHN CARNRICK.

Witnesses:
J. ALLEN McMAKEN,
H. P. REED.